(12) United States Patent
Arnold

(10) Patent No.: US 6,462,781 B1
(45) Date of Patent: Oct. 8, 2002

(54) FOLDABLE TELECONFERENCING CAMERA

(75) Inventor: Thomas A. Arnold, Aliso Viejo, CA (US)

(73) Assignee: Pitcos Technologies, Inc., Newport Beach, CA (US)

(*) Notice: Subject to any disclaimer, the term of this patent is extended or adjusted under 35 U.S.C. 154(b) by 0 days.

(21) Appl. No.: 09/056,573

(22) Filed: Apr. 7, 1998

(51) Int. Cl.[7] .......................... H04N 5/225; H04N 7/14
(52) U.S. Cl. .................. 348/373; D16/202; 348/14.08; 348/14.16
(58) Field of Search ............................... D14/314, 315, D14/317; D16/200, 202, 208, 211; 348/14.01, 14.05, 14.08, 14.16, 207, 373, 375, 376, 552; 396/348, 350, 419, 424, 428; 248/205.1, 205.2, 205.3, 207, 917–922; H04N 5/225, 7/00

(56) References Cited

U.S. PATENT DOCUMENTS

| | | | | |
|---|---|---|---|---|
| D363,730 S | * | 10/1995 | Flohr | D16/200 |
| 5,557,663 A | * | 9/1996 | Huang | 348/14.01 |
| 5,612,733 A | * | 3/1997 | Flohr | 348/14.16 |
| D383,475 S | * | 9/1997 | Yamauchi | D16/202 |
| 5,734,414 A | * | 3/1998 | Nishimura | 348/14.05 |
| 5,768,163 A | * | 6/1998 | Smith | 348/373 |
| D396,869 S | * | 8/1998 | Yamakawa | D16/202 |
| D398,018 S | * | 9/1998 | Lee | D16/202 |
| 5,880,783 A | * | 3/1999 | Ma | 348/373 |
| 5,900,907 A | * | 5/1999 | Malloy | 348/14.1 |
| 5,948,086 A | * | 9/1999 | Lin | 710/100 |
| D426,249 S | * | 6/2000 | Tsujimoto | D16/202 |
| D434,057 S | * | 11/2000 | Whitby | D16/202 |
| 6,178,087 B1 | * | 1/2001 | Cho | 361/686 |
| 6,239,841 B1 | * | 5/2001 | Verstockt | 348/373 |

* cited by examiner

Primary Examiner—Ngoc-Yen Vu
(74) Attorney, Agent, or Firm—Thomas, Kayden Horstemeyer & Risley, LLP

(57) ABSTRACT

A digital miniature, flip-open pocketable camera for video teleconferencing in which the camera lens is positionable on a computer display level with the user's eyes. The camera includes a first housing and a second housing pivotally mounted to the first housing. The first housing comprises a rear lens enclosure and a front lens enclosure which together enclose a lens and a first printed circuit board. The second housing comprises a top base enclosure and a bottom base enclosure which together enclose a second printed circuit board. A flat ribbon cable is further provided for electrically connecting the first and second printed circuit boards contained in the respective housings. The pivotal interconnection permits the first and second housings to open to an angle of 90 degrees with respect to one another.

17 Claims, 5 Drawing Sheets

FOLDABLE TELECONFERENCING CAMERA

BACKGROUND OF THE INVENTION

1. Field of the Invention

The present invention relates generally to digital image processing, and more specifically pertains to miniature digital video teleconferencing imaging systems.

2. Description of Related Art

Video teleconferencing cameras for personal computers are becoming very common. It is desirable to reduce the size of video cameras intended for personal and industrial use in order to increase their range of application. One major challenge for personal computer video camera designers is to locate the camera lens as close to the user's eye level as possible so that the camera is neither too high and looking above the user's forehead, nor too low and looking up the user's nose. Moreover, the ideal location for the camera should not obscure the user's vision of the computer screen.

It is ergonomically correct for the user to look down at the screen, so that the user's eyeballs are approximately level with the top of a computer monitor screen or at a slight distance, such as one inch, below the top. However, conventional teleconferencing cameras are generally designed to be seated on the top of a computer monitor, which means that they are placed too high. For that reason, the typical conventional cameras are designed with a very low height profile in order to place the camera lens as low as possible, for example, as shown in FIG. 1.

Other conventional cameras have the lens mounted at the end of an elongated, flexible shaft, which gives them the appearance of an eye on a very long neck, as shown in FIG. 2. This structure allows manual adjustment of the lens location with a high degree of freedom, but the design may obscure the computer monitor screen. Further, the device is not pocketable and such cameras appear visually threatening due to their shape, which is remindful of scary creatures from horror films. Moreover, the conventional teleconferencing cameras do not provide a variety of mounting options, and very few can be fixedly secured to a computer monitor or to a screen of a portable computer.

Furthermore, since conventional video cameras are not fixedly secured to the computer display screen, they may easily be subjected to vibrations and impacts, which are transmitted to the inner electronic elements. Additionally, in the conventional models of teleconferencing cameras, all electronic components are grouped in the same casing, which prohibits the distribution and dissipation of heat. The foregoing heat and vibration problems lead to an undesirable decrease in the reliability of video cameras.

Therefore, there is a need for a miniature, pocketable digital video teleconferencing camera for desktop or portable computers which has a simple and aesthetically pleasing design. Moreover, there is a need for small, low cost, digital teleconferencing cameras for consumers, which are inexpensive, suitable for mass production, durable, ergonomically comfortable, and which provide ease of handling, high fidelity images with inexpensive lenses, a wide range of uses, and a variety of mounting options.

OBJECTS AND SUMMARY OF THE INVENTION

It is therefore an object of the present invention to improve video cameras.

It is a primary object of the present invention to overcome the aforementioned shortcomings associated with the prior art and provide a miniature and pocketable digital video teleconferencing camera for provision of high quality images at low cost.

Another object of this invention is to provide a small video camera for desktop or portable computers in which the camera lens is level with the user's eyes and which is reasonably resistant to vibrations and impacts to which the casing may be subjected.

Still other objects of this invention are to minimize the space required for the camera and to enhance the distribution and dissipation of heat by the shape of the camera.

Yet another object of this invention is to provide a small video camera which can be fixedly secured to a computer monitor or the screen of a portable computer and which is suitable for mass production and use in a variety of consumer imaging applications.

These, as well as additional objects and advantages of the present invention, are achieved by a digital video teleconferencing camera including a first housing and a second housing pivotally mounted to the first housing. The first housing comprises a rear lens enclosure and a front lens enclosure which together enclose a lens and a first printed circuit board. The second housing comprises a top base enclosure and a bottom base enclosure which together enclose a second printed circuit board. Cable means is further provided for electrically connecting the first and second printed circuit boards contained in the respective housings. The pivoted interconnection permits the first and second housings to open to a predetermined angle with a respect to one another. When opened to the predetermined angle, the camera may be placed on the corner of a computer display screen such that the lens housing extends downwardly in front of the display screen level with the user's eyes.

The invention thus facilitates implementation of a digital miniature, flip-open, pocketable camera for video teleconferencing in which the camera lens is level with the user's eyes, and which is attachable to a desktop or portable computer display. The invention further facilitates such a camera which is inexpensive, durable, ergonomically comfortable, easy to operate, and is adaptable to a variety of mounting options. Enhanced distribution and dissipation of heat is additionally because its two part construction entirely separates the first and second printed circuit boards from one another.

BRIEF DESCRIPTION OF THE DRAWINGS

The objects and features of the present invention are set forth with particularity in the appended claims. The present invention, both as to its organization and manner of operation, together with further objects and advantages, may best be understood by reference to the following description, taken in connection with the accompanying drawings, wherein:

DETAILED DESCRIPTION OF THE PREFERRED EMBODIMENTS

Figure 1:
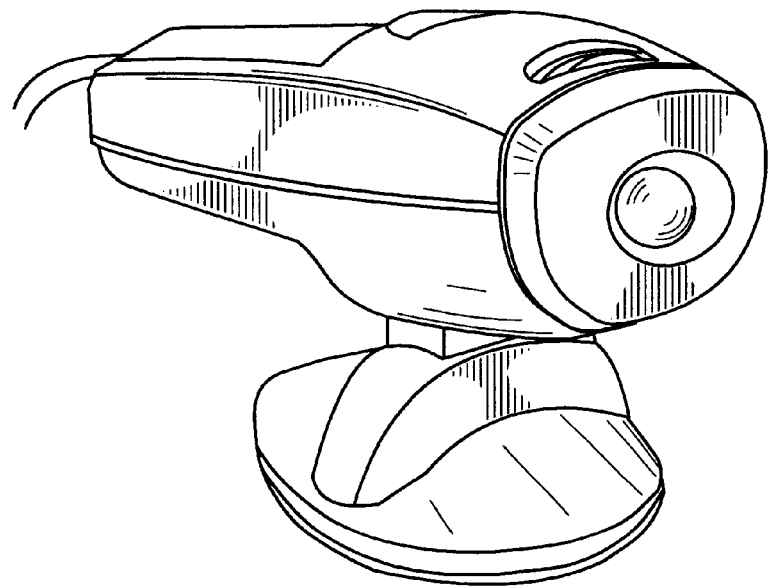
FIG. 1 is a perspective view of a prior art video camera.
Figure 2:
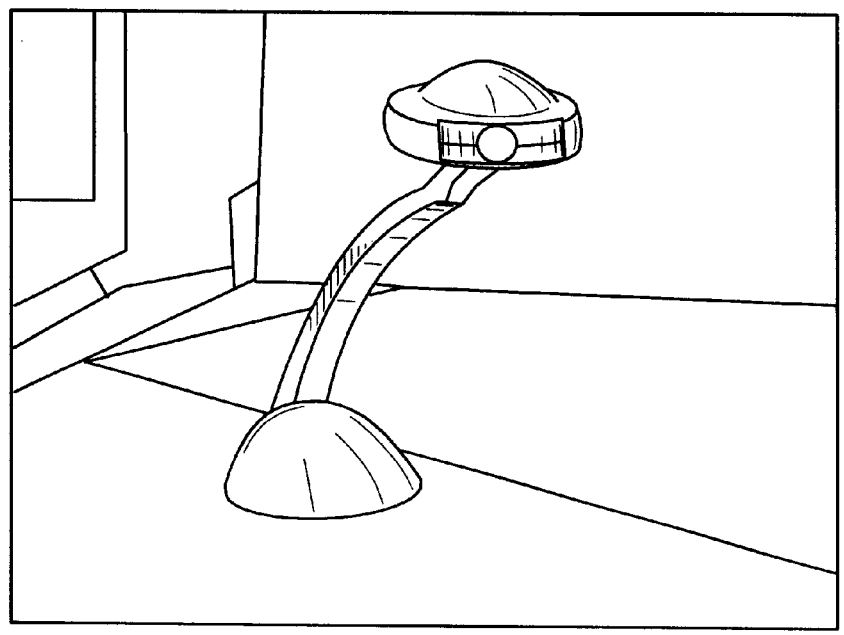
FIG. 2 is a perspective view of a prior art video camera.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an inexpensive, readily manufactured and easily used miniature digital video teleconferencing imaging system.

A miniature digital video teleconferencing camera 11, according to the preferred embodiment, is illustrated in FIGS. 3–7. The preferred embodiment camera 11 includes two main components: (1) a base housing 13 and (2) a lens housing 15. The lens housing 15 is pivotably attached to the base housing 13 by a hinge mechanism including first and second hinges 24. The hinges 24 include male hinge elements 56 and female hinge elements 54 (FIG. 8), preferably molded respectively into plastic molded exterior surfaces of the base and lens housings 13, 15 such that the two respective housings 13, 15 can be snapped together while preserving their pivotably mounted relationship. Such a built-in hinge mechanism may be referred to as an "inherent hinge."

Figure 3:
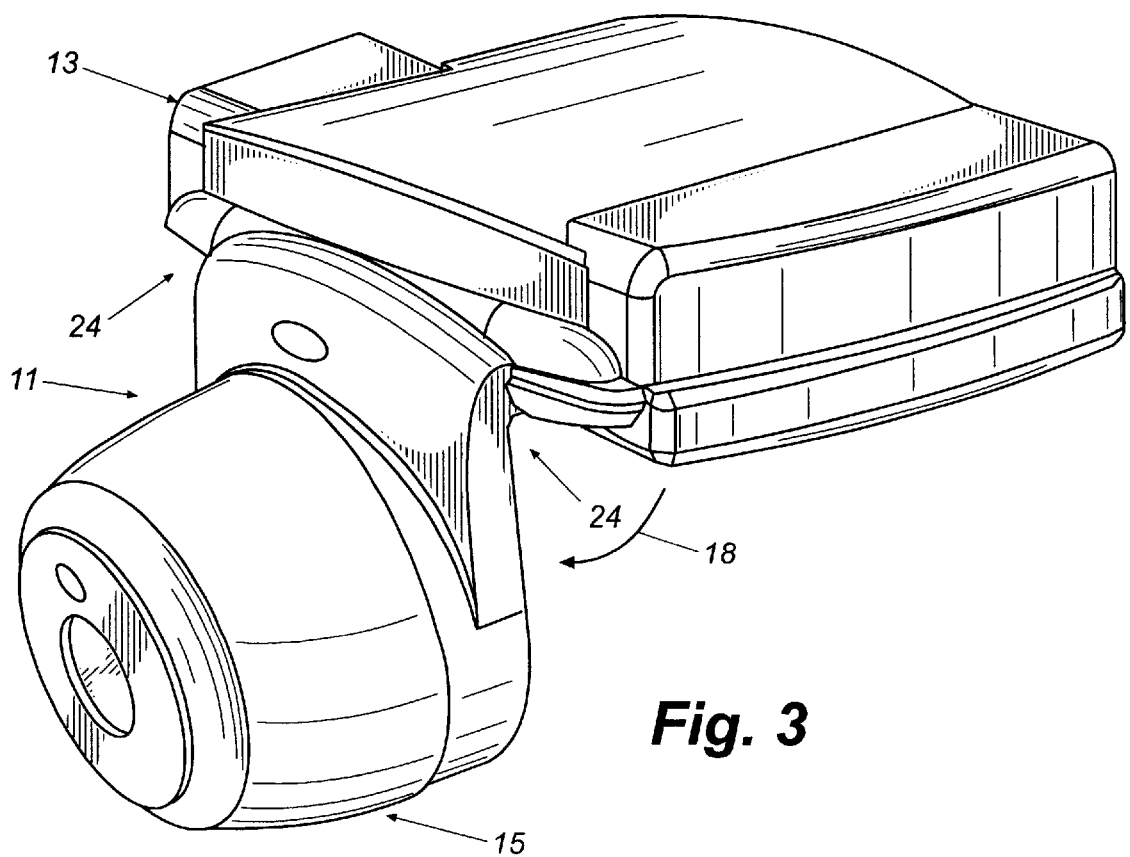
FIG. 3 is an a perspective view of a miniature video teleconferencing camera in accordance with the preferred embodiment of the present invention.
Figure 4:
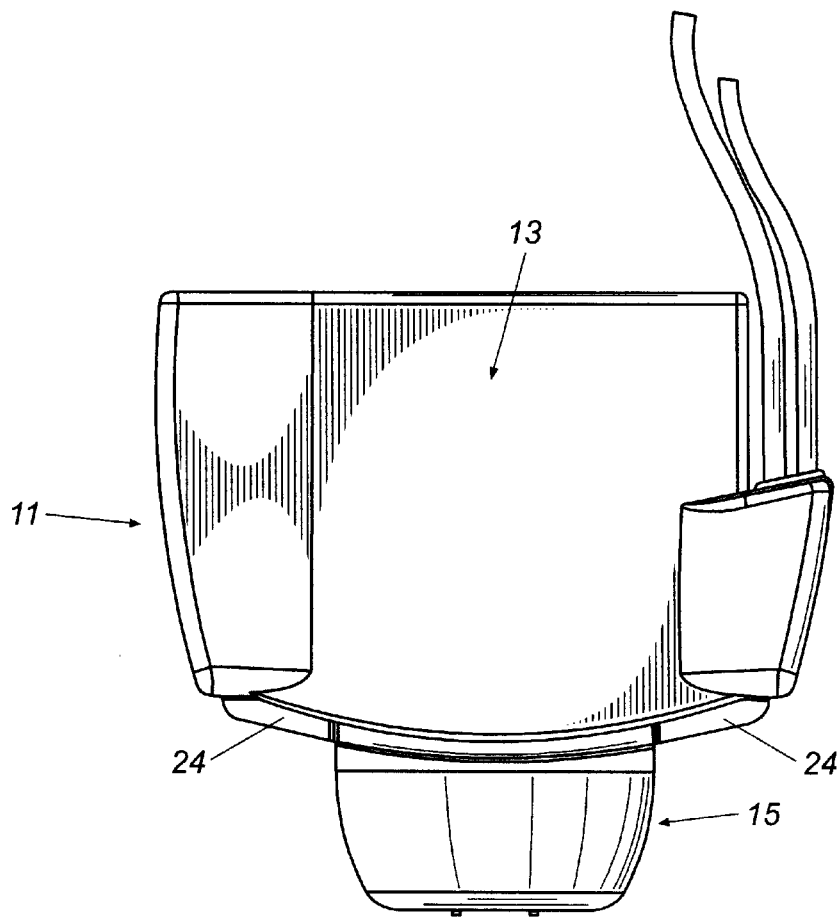
FIG. 4 is a top view of the video camera of FIG. 3.
Figure 5:
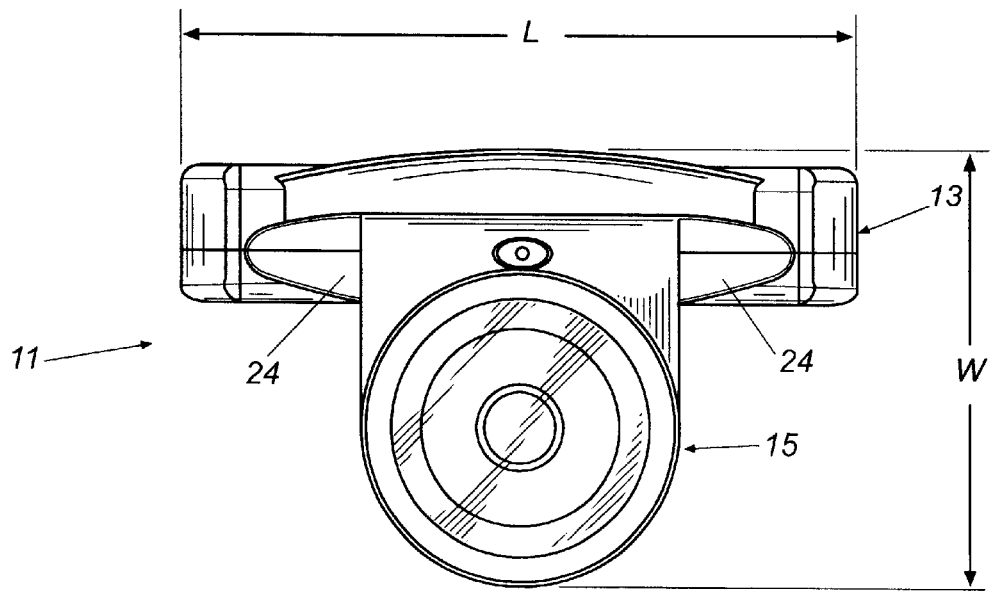
FIG. 5 is a front view of the video camera of FIG. 3.
Figure 6:
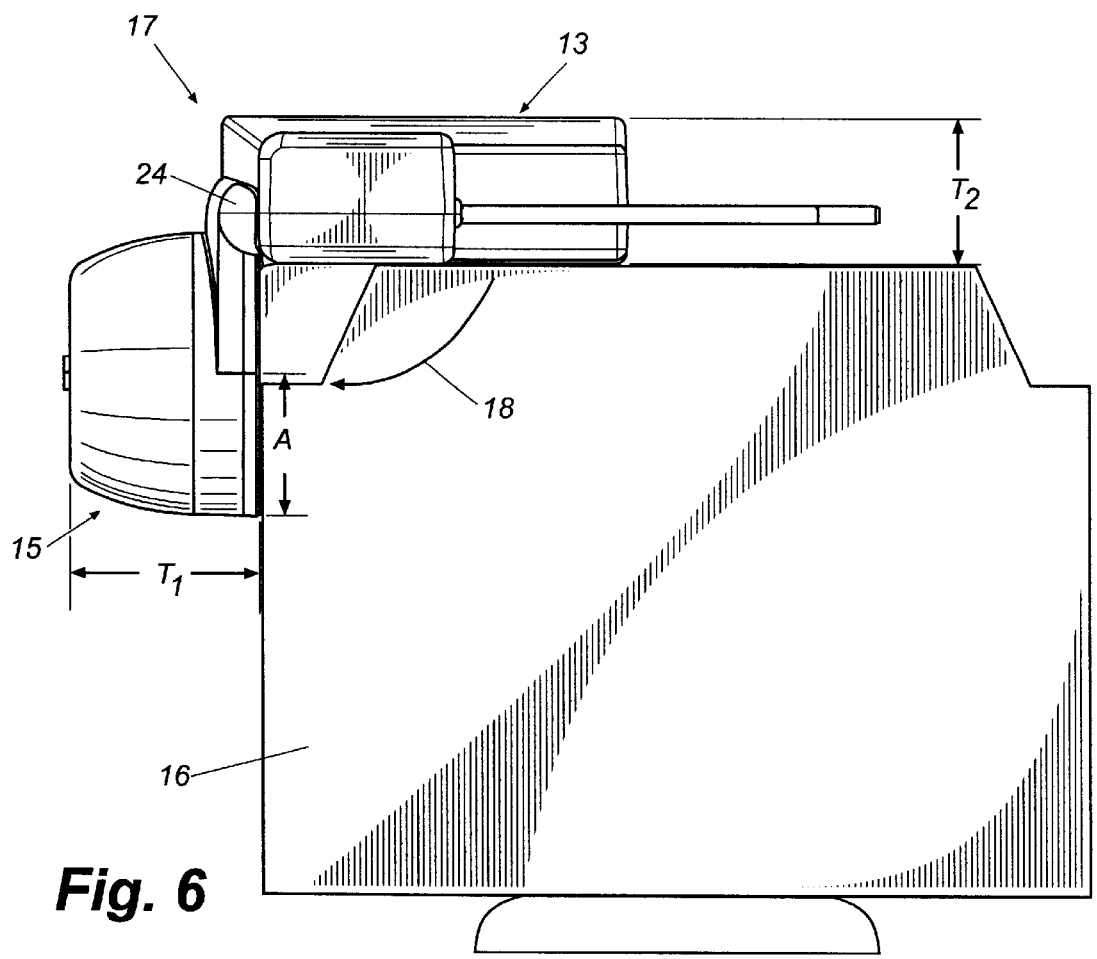
FIG. 6 is a side view of the video camera of FIG. 3.

The hinges 24 permit the camera housings 13, 15 to be flipped open in the direction of arrow 18 to an angle of up to 90 degrees, as shown in FIG. 3 and in the side view of FIG. 6. Thus, when opened, the camera profile is in two planes, horizontal and vertical. In the open state, the base housing 13 may rest on the top surface of a desktop computer monitor 16, while the lens housing 15 hangs over the upper bezel of the monitor 16, as further shown in FIG. 6. In this position, the lens housing 15 extends down a distance "A" of about one inch below the top edge of the computer display screen. Since most computer display screens have toolbars with icons occupying the top inch of the display screen, the lens housing 15 does not significantly impair the use of the screen.

Figure 7:
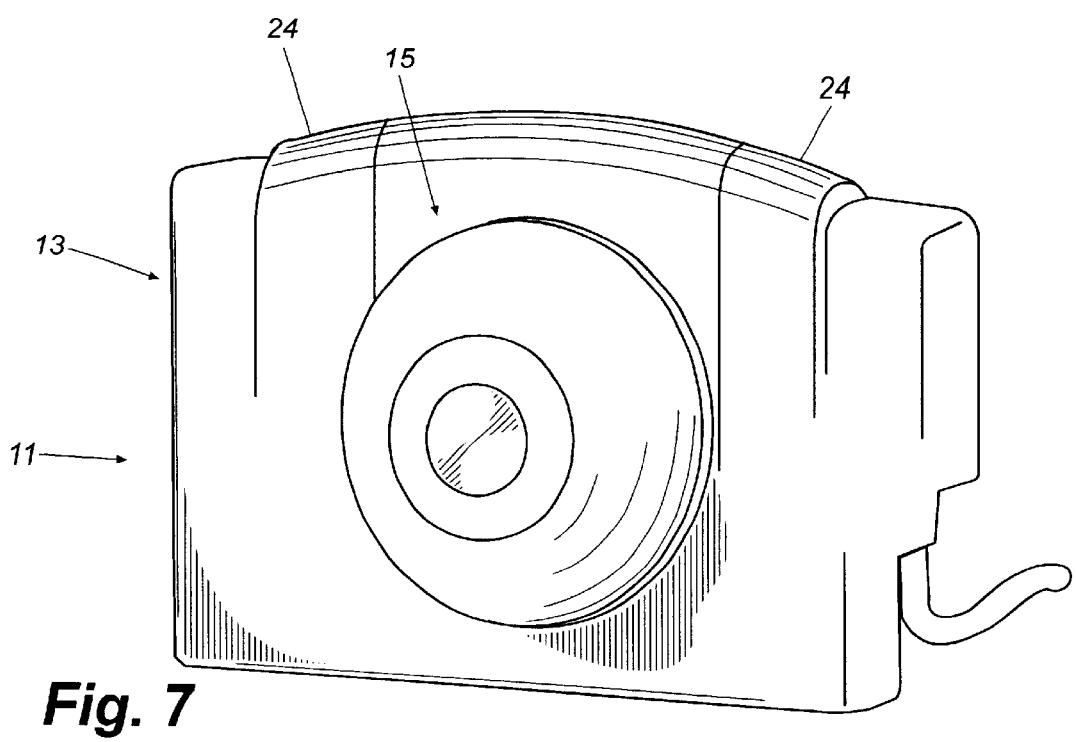
FIG. 7 is a perspective view of the camera of FIG. 3 in the folded state.

The hinges 24 further permit the camera 11 to be folded up and placed to stand vertically, as shown in FIG. 7. In this configuration, the lens housing 15 folds into the base housing 13 in a generally flush relationship. In the folded-up configuration of FIG. 7, the camera 11 may be mounted to a conventional tripod (not shown). In either the open or closed state, the camera may be attached to a portable computer display or a desk top computer monitor via Velcro™ strips (not shown) for preventing axial sliding movements of the camera relative to the display screen and for securing the camera at any location where use of the video camera may be desired.

Figure 8:
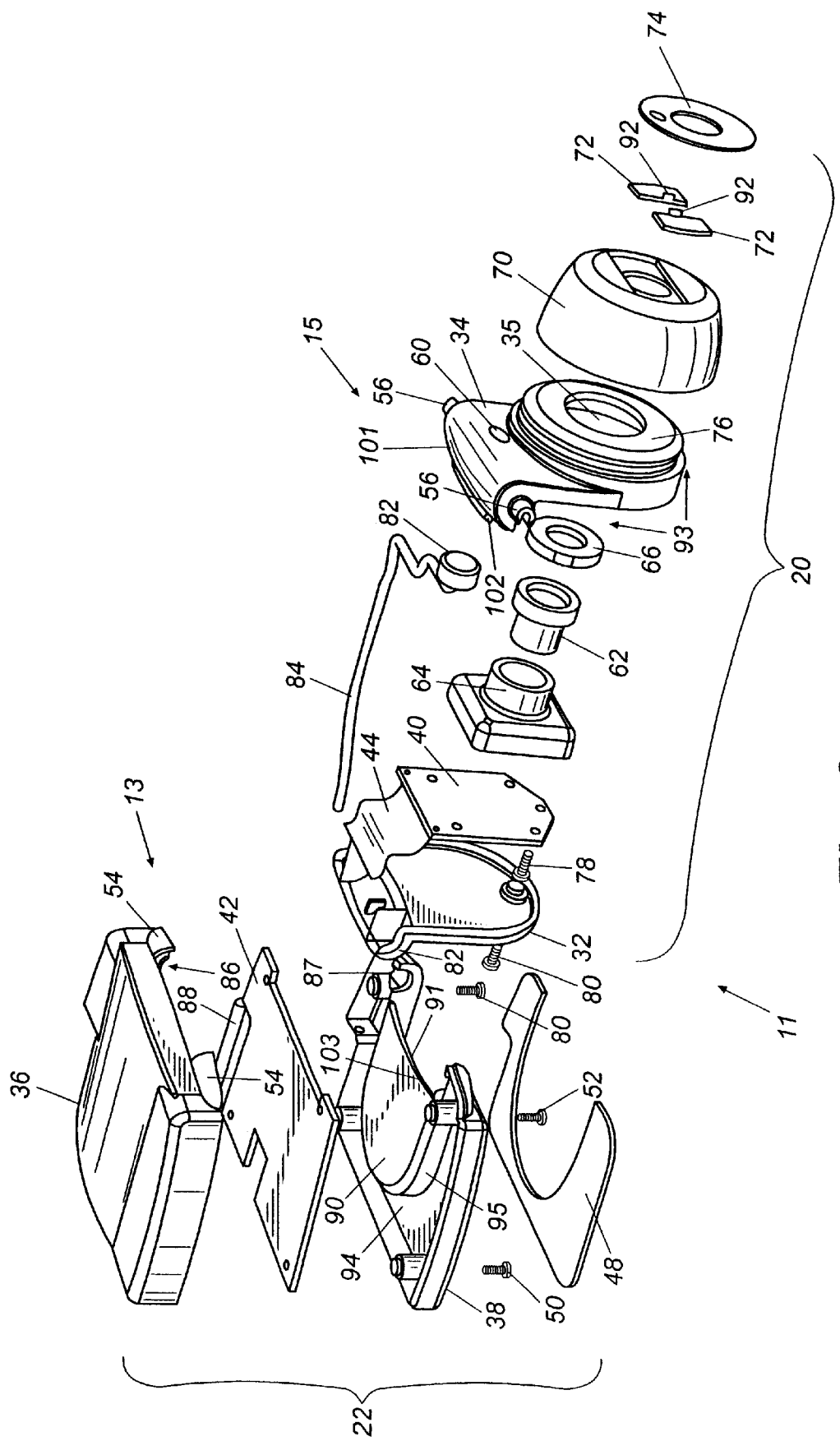
FIG. 8 is an exploded perspective view of the video camera of FIG. 3.

The base housing 13 and lens housing 15 each comprise an assembly of components, 20, 22, as shown in FIG. 8. With reference to FIG. 8, it may be seen that the lens assembly 20 includes a rear lens enclosure 32 and a front lens enclosure 34. The lens assembly 20 further includes a printed circuit board (PCB) 40, disposed between the lens enclosure 32 and the front lens enclosure 34. The PCB 40 in electrical circuits for cooperating with a lens 62. Such circuits include a digital image sensor array with attendant control and timing circuitry, an analog-to-digital converter, and a non-volatile memory. The image generating apparatus within the front and rear lens enclosures 32, 34 may comprise a digital camera, such as a CIF camera.

The base assembly 22 includes a top base enclosure 36 and a lower base enclosure 38. A printed circuit board (PCB) 42 is disposed between the top base enclosure 36 and the bottom base enclosure 38, and includes a plurality of electronic components mounted thereon including an image processor, a clock crystal, and a memory buffer. The PCB 42 in the base housing 13 also has a bus interface controller for controlling communications with a host computer, preferably via a Universal Serial Bus (USB).

The PCBs 40 and 42 in the respective lens and base assemblies 20, 22 are electrically connected to each other by an electrical connector, preferably a flexible flat ribbon cable 44, inserted through an opening in the upper part of the rear lens enclosure component 32. The flexible nature of the ribbon cable 44 allows it to bend when the camera is opened and folded. The flexible flat ribbon cable 44 conducts the image sensor array output signal to the PCB 44. It will be appreciated that the flexible flat ribbon cable 44, in addition to connecting the PCBs 40 and 42 also serves to electrically connect the various electronic parts mounted on both faces of each of the PCBs 40 and 42.

An electrical connector 88 is also mounted on the PCB 42. This connector 88 provides a port at which to access both the video signal of the camera and an audio signal derived from a microphone 82. The microphone 82 resides behind a microphone opening 60 on the front lens enclosure 34 and provides voice transmission via microphone cable 84 inserted into housing 13.

The base PCB 42, the top base enclosure 36 and the bottom base enclosure 38 are held together with four screws 50, 52. These screws 50, 52 are preferably thread-forming screws. The front two screws 52 can be tightened or loosened to stiffen or loosen the hinge mechanism comprising male pin portions 56 and female receptacle portions 54.

FIG. 8 further illustrates the pins 56 of the hinge mechanism, one on each side of the front lens enclosure 34, each projecting outward sidewise from the front lens enclosure 34. As may be further seen in FIG. 8, the female hinge receptacles 54 are barrel-shaped and spaced apart from one another on respective sides of the top base enclosure 36. The male pin portions 56 pivot in openings formed by the conjunction of semicircular openings 86, 87.

Additionally, from a side perspective, the front lens enclosure 34 has a curved sloping surface 101 from which a lip 102 extends horizontally. In the open state, the lip 102 abuts the inside 103 of the bottom base enclosure 38 so as to prevent the front lens enclosure 34 from opening relative to the top base enclosure 36 by more than ninety degrees.

The front lens enclosure 34 further has a passageway 35 of circular cross-section extending therethrough, which provides an optical light path to the lens 62. The lens 62 threadably inserts into a lens mounting bracket 64 and is held in position by a lens retaining cap 66. A focus adjusting ring 70 is threadably mounted onto a threaded barrel portion 76 of the front lens enclosure 34. The focus adjusting ring 70 is movable in an axial direction according to rotation thereof and interlocks with. retaining cap 66 via molded-in interlocking grooves. The retaining cap 66 is adhesively adhered to the lens 62. Four screws 78 are used for securing the lens mounting bracket 69 to the lens PCB 40 and the PCB 40 is in turn screwed to the lens enclosure rear housing 32 with two screws 80.

As may be appreciated, manually turning the focus ring 70 actuates the lens 62 which threads in or out of the lens mounting bracket 64, thus controlling the distance between the lens 62 and the object and focusing the images provided by the lens 62 onto the cooperating image sensor array. The preferred embodiment may also be equipped with two privacy doors 72 manually opened and closed by holding respective protuberances 92 and sliding the privacy doors 72 apart or together, thereby exposing or covering up the lens 62. A lens overlay 74 may also be provided which holds the privacy doors 72 in place and which may have a rear silk-screened polycarbonate label displaying an icon or logo.

The outside periphery of the bottom base enclosure 38 is formed with a recessed area 90 terminating in a recessed edge 91. The recessed area 90 is dimensioned to receive the cooperating portion of the rear lens enclosure 32 and to provide for alignment of the rear lens enclosure 32 with the bottom base enclosure 38 when the camera 11 is closed as in FIG. 7. Since the rear lens enclosure 32 and the front lens enclosure 34 exhibit a rounded bottom contour 93, the recessed area 90 also has a conformably rounded, outer contour 95 to provide for the flush mating of two housings as shown in FIG. 7. The bottom surface 94 adjacent the recessed area 90 is fitted on its opposite side with a rubber anti-skid pad 48.

When in use, the camera 11 is either fixedly secured to the computer display monitor via Velcro™ strips, or is supported in both horizontal and vertical direction when it is opened and placed on the top of the computer display. Therefore, the camera 11 is less subject to vibrations and impacts which would be transmitted to the inner electronic elements. Additionally, since the electronic components are not grouped in the same casing, but into two completely separate housings 13, 15, distribution and dissipation of heat is improved. Further, vibrations and impacts are cushioned by the resilient screws 50, 52, 78, and 80 and are not transmitted to the PCBs 40, 42. Vents may also be added in the plastic housings for heat dissipation.

The digital imaging system, designed according to the principles of the preferred method of the present invention is especially applicable for CIF video teleconferencing cameras and digital still cameras of mass production, usable in many consumer imaging applications. It is small in size, light, durable, ergonomically comfortable, pocketable, produces higher fidelity images and is easy to handle. As regards size, a camera 11, according to the preferred embodiment, may have a length "L" of about 3.7" (FIG. 5), the width "W" of about 2.45" (FIG. 5), and thicknesses "$T_1$" and "$T_2$" of about 1.2" and 0.91" (FIG. 6).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A digital video teleconferencing camera comprising;
    a lens and a first printed circuit board with electronic elements mounted thereon, said lens and first printed circuit board being secured within a first housing comprising a rear lens enclosure and a front lens enclosure;
    a second printed circuit board with electronic elements mounted thereon, said second printed circuit board being secured within a second housing comprising a top base enclosure and a bottom base enclosure;
    means for pivotably interconnecting said first and second housings such that they may open to a predetermined angle with respect to one another;
    a cable means for electrically connecting the first and second printed circuited boards and the electronic elements mounted thereon; and
    wherein said first and second housings include surfaces adapted to permit said camera to rest on a top surface of a computer monitor display with the second housing hanging over an upper bezel of the computer monitor display and extending down at least one inch below the top edge of the computer monitor display, whereby the camera is supported in both horizontal and vertical direction by the respective front and top surfaces of the computer display.

2. The camera according to claim 1, wherein said means for pivotably interconnecting comprises a pair of first hinge elements molded integrally with the front lens enclosure and a second pair of hinge elements molded integrally with the top base enclosure; said front lens enclosure having a curved sloping top surface and a lip means extending therefrom for abutting the bottom base enclosure in order to limit pivoting of the front lens enclosure relative to the bottom base enclosure.

3. The camera according to claim 2, wherein said first pair of hinge elements comprises two pins, one projecting outwardly from each side of the front lens enclosure and said second pair of hinge elements comprises two spaced-apart barrel-shaped openings on respective sides of said top base enclosure.

4. The camera according to claim 3, further including front and back screw means for holding the second printed circuit board, the top base enclosure and the bottom base enclosure secured together, the front screw means being tightenable to vary the amount of force required to pivot said first housing with respect to said second housing.

5. The camera according to claim 1, wherein said predetermined angle is 90 degrees.

6. The camera according to claim 1, wherein the rear lens enclosure and the front lens enclosure include a rounded bottom contour and wherein the bottom base enclosure includes a recessed area dimensioned to receive, when the camera is closed, the rear lens enclosure.

7. The camera according to claim 1, further including within said first housing a threaded lens mounting bracket through which the lens is mounted, a lens retaining cap, a focus adjusting ring, threaded at its inner side and engageable with an externally threaded mounting opening of the front lens enclosure and movable in an axial direction by rotation thereof, a pair of lens privacy doors and a lens overlay holding the privacy doors in place, wherein manually turning the focus ring causes the lens to thread in or out of the lens mounting bracket, thus controlling the distance between the lens and the object.

8. The camera according to claim 1, wherein the camera further comprises a microphone means for providing an audio signal output.

9. The camera according to claim 1, wherein the second housing further comprises a rubber anti-skid pad means for preventing axial sliding movements of the camera.

10. The camera according to claim 1, wherein the second housing further comprises attachable Velcro™ strips for preventing axial sliding movements of the camera relative to a computer monitor display and protecting the first and second printed circuit boards from vibrations and impacts.

11. The camera according to claim 1, wherein the first housing further includes a connector means electrically connected to said second printed circuit board and wherein said second printed circuit board includes a bus interface controller for communicating with a host computer.

12. A digital video teleconferencing camera mountable to a desktop computer monitor or a portable computer display, comprising:

a lens and a first printed circuit board with electronic elements mounted thereon, said lens and first printed circuit board being secured within a first housing comprising a rear lens enclosure and a front lens enclosure;

a second printed circuit board with electronic elements mounted thereon, said second printed circuit board being secured within a second housing comprising a top base enclosure and a bottom base enclosure;

means for pivotably interconnecting said first and second housings such that they may open to a predetermined angle with respect to one another;

a flexible flat ribbon cable passing from said first housing into said second housing and electrically interconnecting the first and second printed circuit boards;

said means for pivotally interconnecting being molded into said first and second housings; and said front lens enclosure having a curved sloping surface and a lip positioned to abut the bottom base enclosure to restrict pivoting of the front lens enclosure relative to the bottom base enclosure.

13. The camera according to claim 12, wherein said means for pivoting comprises:

two pins, one on each side of the front lens enclosure and projecting outwardly sidewise from the front lens enclosure; and two barrel-shaped, spaced-apart openings on respective sides of said bottom base enclosure shaped to accept and retain the pins, and wherein the second printed circuit board, the top base enclosure and the bottom base enclosure are secured together with a front and a back screw means holding the base assembly together, and the front screw means is tightenable to stiffen the means for pivoting.

14. The camera according to claim 13, wherein said first and second housings include surfaces adapted to permit said camera to rest on a top surface of a computer monitor display with the second housing hanging over an upper bezel of the computer monitor display and extending down at least one inch below the top edge of the computer monitor display, whereby the camera is supported in both horizontal and vertical direction by the respective front and top surfaces of the computer display.

15. The camera according to claim 14, wherein the rear lens enclosure and the front lens enclosure include a rounded bottom contour, and wherein the bottom base enclosure includes a recess dimensioned to receive said rounded bottom contour, and wherein the lens assembly has a lens, a threaded lens mounting bracket through which the lens is mounted, a lens retaining cap, a focus adjusting ring, threaded at its inner side and engageable with an externally threaded mounting opening of the lens enclosure front housing and movable in an axial direction according to rotation thereof, lens privacy doors and a lens overlay holding the privacy doors in place, wherein manually turning the focus ring actuates the lens which threads in or out of the lens mounting bracket, thus controlling the distance between said lens and the object.

16. The camera according to claim 14, wherein the camera further comprises a microphone providing an audio signal from the camera, the second housing further comprises a rubber anti-skid pad for preventing axial sliding movements of the camera relative to a computer monitor display and for securing the camera at any location where use of the video camera may be desired, and attachable Velcro™ strips for preventing axial sliding movements of the camera relative to a computer monitor display and protecting the first and second printed circuit board from vibrations and impacts.

17. The camera according to claim 14, wherein the second printed circuit board of the base housing has a connector and a bus interface controller controlling communication with a host computer, and wherein the location of the electronic components of the first printed circuit board and the second printed circuit board improves heat distribution and dissipation.

\* \* \* \* \*